INVENTOR.
JAMES M. PORTER
BY
ATTORNEY

Dec. 14, 1971  J. M. PORTER  3,626,710
CRYSTALLIZATION PREVENTION CONTROL FOR
ABSORPTION REFRIGERATION MACHINES
Filed Sept. 9, 1969  2 Sheets-Sheet 2

INVENTOR.
JAMES M. PORTER

BY

ATTORNEY

United States Patent Office

3,626,710
Patented Dec. 14, 1971

3,626,710
CRYSTALLIZATION PREVENTION CONTROL FOR ABSORPTION REFRIGERATION MACHINES
James M. Porter, La Crosse, Wis., assignor to
The Trane Company, La Crosse, Wis.
Filed Sept. 9, 1969, Ser. No. 856,266
Int. Cl. F25b 15/06
U.S. Cl. 62—141                                        6 Claims

ABSTRACT OF THE DISCLOSURE

A control which senses impending crystallization is utilized in an absorption refrigeration machine to prevent solidification of absorption solution in the critical areas of the machine. A sensing element senses a rise in concentrated solution level between the generator and the heat exchanger, which rise in solution level is indicative of impending crystallization. This sensor can actuate one or more of a plurality of controls which will cause dilution of the concentrated solution in the heat exchanger or other crystallization prone areas. As the solution level in the conduit between the generator and the heat exchanger returns to an operating level, additional automatic controls are actuated to proceed with a dilution and shutdown cycle.

BACKGROUND OF THE INVENTION

This invention relates to an absorption refrigeration machine, and more particularly, to a means for preventing and decrystallizing sensitive areas of the absorption machine when a predetermined condition occurs.

During operation of an absorption refrigeration machine, the occurrence of accidents or malfunctions can cause solidification or crystallization of absorption solution in the flow passages of the machine. One of the most common sites for crystallization is in the concentrated solution passage of the heat exchanger. At this point the absorption solution has been concentrated by the generator and is being forced back to the absorber. Between the generator and the absorber the concentrated solution passes through a heat exchanger, releasing heat to dilute absorbent solution being pumped to the generator from the absorber. If for some reason the absorbent solution becomes too concentrated or is cooled below its crystallization temperature, the concentrated solution flow passage beings to block and eventually closes completely. This condition can occur over a period of very few minutes and has been known to occur in less than a minute.

A number of conditions can cause crystallization of the concentrated absorbent solution in the heat exchanger. For example, the presence of air or other inert gas in the absorber will prevent dilution of the absorbent solution therein. This will cause the concentration of the concentrated absorbent solution to rise and eventually crystallize. Also, if the condenser water becomes colder than normal operating temperature, it will reduce the temperature of the dilute absorbent solution leaving the absorber. This in turn will reduce the temperature of the concentrated absorbent solution in the heat exchanger below the crystallization point and begin to block the heat exchanger. Over-firing the generator resulting in supersaturation of the absorbent solution will also cause crystallization blockage of the heat exchanger passages.

It is desirable to prevent any of the above conditions from ever occurring. However, because of malfunction or accident it is impossible to prevent crystallization in the heat exchanger at all times. When crystallization and heat exchanger blockage occurs, the only practical method of clearing the heat exchanger passages has been to heat them directly and liquefy the absorbent solution therein. It is, therefore, most desirable to possess a means for sensing crystallization or impending crystallization and to clear heat exchanger passages before they become so completely blocked that external heat must be applied.

SUMMARY OF THE INVENTION

This invention therefore provides an absorption refrigeration machine including an absorber, an evaporator, a condenser, a generator means for producing concentrated absorption solution, first conduit means for conducting concentrated solution from the generator means to the absorber, second conduit means for conducting dilute solution from the absorber to the generator means, and a heat exchange means for placing the second conduit means in heat exchange relationship with the first conduit means at a point between the generator and the absorber, the heat exchange means having a first flow passage comprising a portion of the first conduit means and a second flow passage comprising a portion of the second conduit means, the heat exchange means positioned below the generator means, the improvement comprising: sensing means for sensing a rise in level of concentrated solution in the first conduit means between the generator and the heat exchange means, the sensing means positioned above a normal operating level of concentrated solution in the first conduit means, control means responsive to the sensing means, and anticrystallization means for reducing the concentration of solution in the first flow passage means, the anticrystallization means activated by the control means.

Preferably the sensing means includes a float chamber and a sensor within the float chamber which indicates a rise in concentrated solution level. The preferred anticrystallization means for the absorption refrigeration machine described above, and additionally including a first heat exchanger in the evaporator, a collection pan being positioned below the heat exchanger, first circuit means including the pan for recirculating refrigerant from the collection pan for distribution onto the first heat exchanger, comprises: a third conduit means for placing first circuit means and the first flow passage means in fluid communication and a first valve means for controlling flow in the third conduit means. The first valve means being closed during a normal operational cycle of the machine. The control means actuating the first valve means.

DESCRIPTION OF THE PREFERRED EMBODIMENTS

Figure 1:
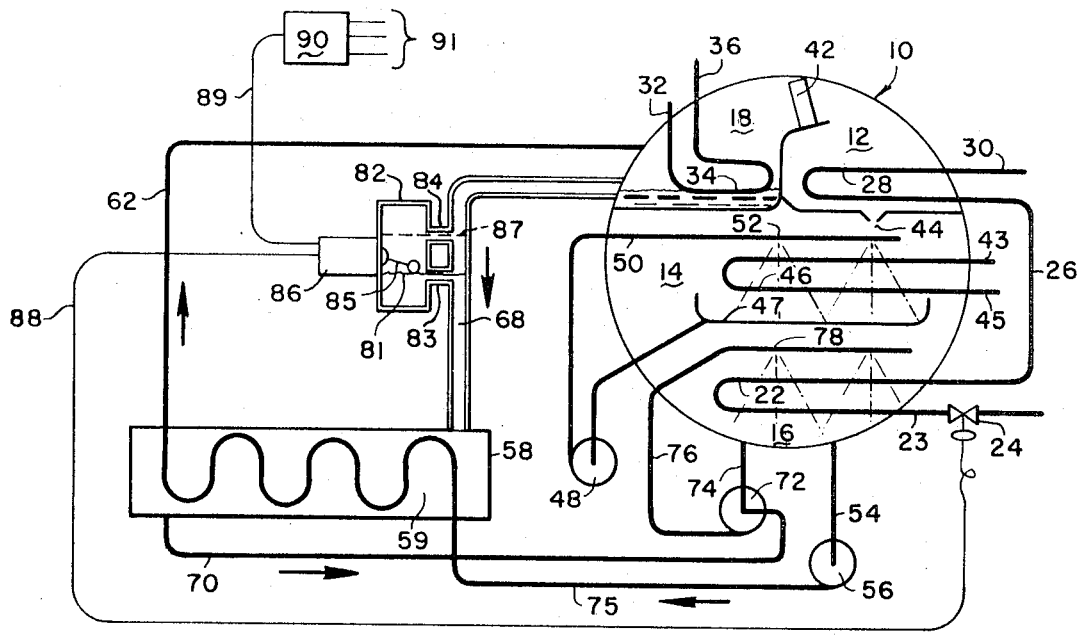
FIG. 1 is a schematic illustration of an absorption refrigeration machine employing an embodiment of the present invention. It illustrates a float control for modifying the flow of absorber cooling water.

Referring to FIG. 1, an absorption machine, enclosed by fluid tight shell 10, contains a condenser 12, an evaporator 14, an absorber 16, and a generator 18. The absorber 16 contains a heat exchanger 22 supplied with cooling fluid through a conduit 23 from a cooling tower (not shown) to remove heat from the absorber and condenser. This cooling fluid is conducted by a conduit 26 to heat exchanger 28 in condenser 12. The cooling fluid leaves the condenser through a conduit 30 and is returned to a cooling tower or other suitable source for cooling fluid. The flow of cooling fluid is modulated by valve 24 positioned in conduit 23. The valve 24 can be of any remotely controlled type, for example, a pneumatically actuated or an electro-mechanically actuated valve.

Various suitable types of refrigerants and absorbents may be used in the present machine. A solution of lithium bromide absorbent in a refrigerant such as water is satisfactory. The term "concentrated solution" as used herein means a solution which is concentrated in absorbent. A "dilute solution" is one which is dilute in absorbent.

Steam flows from a source 32, such as a boiler, to a heat exchanger 34 in generator 18. Heat exchanger 34 is adapted to return steam condensate to the source of steam via conduit 36. It is, of course, understood that other suitable sources of heat can be used to concentrate absorbent solution in the generator 18. Heat from condensing steam in the generator heat exchanger 34 causes dilute solution in the generator to boil, thus producing refrigerant vapor and concentrating the absorbent solution.

The refrigerant vapor generated in the generator 18 flows through a liquid eliminator 42 into the condenser 12, in which the refrigerant is condensed to a liquid by heat exchange with the cooling fluid in heat exchanger 28. The liquid refrigerant flows from the condenser through orifice 44 into the evaporator 14.

A refrigerant liquid is vaporized in evaporator 14, thus removing heat from a chilled fluid being circulated through heat exchanger 46. The chilled fluid enters shell 10 through a conduit 43 and leaves through conduit 45. This chilled fluid is circulated to a heat load.

Since absorber section 16 is in vapor communication with the evaporator 14, the absorbent solution can absorb refrigerant vapor from the evaporator, thus removing heat from the evaporator section. Refrigerant liquid dropping from the heat exchanger 46 is collected by pan 47. It flows from the pan through a conduit 49 to a pump 48 which delivers the refrigerant liquid through a conduit 50 to be sprayed in evaporator 14 through nozzles 52.

Dilute solution from the absorber 16 flows through conduit 54, pump 56, conduit 75 and heat exchanger 58, in conduit 62 to the generator 18 in which it is concentrated. The concentrated solution from the generator 18 flows through conduit 68 into the heat exchanger 58, in which it transfers heat to the weak solution flowing from conduit 54. From the heat exchanger 58 the concentrated solution flows through a conduit 70 to pump 72, at which point it mixes with dilute solution flowing from the absorber 16 through conduit 74. The mixed solution is forced by pump 72 through conduit 76 and is discharged into the absorber 16 through spray nozzles 78. It is to be understood that all pumps are driven by suitable motors which, for simplicity, have not been shown.

The concentrated absorbent solution flow passage 68 between the generator and heat exchanger 58 has been shown as a walled conduit, whereas all remaining conduits in the figure are illustrated as heavy lines. During normal refrigerant operation of the absorption machine, dilute absorbent solution is pumped from the absorber to the generator. As the solution becomes more concentrated it flows from generator 18 into conduit 68. A conventional absorption machine is designed so that the normal operating level of concentrated solution is somewhere between the level of solution in the generator and the entrance to heat exchanger 58. Under normal operating conditions the solution level in conduit 68 remains below the level indicated at 81. However, when the concentrated solution flow passage 59 in heat exchanger 58 begins to clog or block due to crystallization of the solution, the level 81 of absorbent solution in conduit 68 begins to rise. Upon full blockage if the machine is not shut down the solution level can rise into and flood generator 18. A float chamber 82 is provided in parallel connection with conduit 68 so that it has an inlet 83 and an outlet 84. A float 85 or other suitable level sensing device is located in float chamber 82. As the level of solution rises in conduit 68, it will also rise in float chamber 82 and cause float 85 to actuate a control 86 upon reaching predetermined level 87. The control 86 can be of any conventional float actuated design, for example, a pneumatic relay or an electro-mechanical relay.

In the embodiment of FIG. 1 the control 86 upon being actuated by a rising concentrated solution level will transmit a signal through control line 88. The control signal is received by normally open, automatic valve 24 which is responsive to such a signal. If the control 86 is pneumatic, it follows that the valve 24 will be responsive to a pneumatic control signal. Therefore, as the heat exchanger passage 59 begins to block due to crystallization the rising level will cause control 86 to actuate valve 24 which in turn will shut off the flow in conduit 23. As the cooling water to the absorber 16 is cut off, the heat generated by absorption of refrigerant will be retained by the dilute absorbent solution being pumped through conduit 75 into heat exchanger 58. This will result in a lesser heat load placed on the heated concentrated solution still flowing through exchanger passage 59. It will resultantly allow the temperature of the partially crystallized absorbent solution to rise above crystallization temperature. As this occurs the salt crystals will go back to solution and the passage 59 will again allow free flow of concentrated solution.

However, since crystallization is usually caused by some outside occurrence which must be corrected before proper normal operation of the machine can resume, this embodiment of the invention will also automatically shut down the absorption machine after the heat exchange passage 59 has been cleared. As the passage 59 clears the solution level in conduit 68 will drop from its abnormally high position 87 down to or below the normal operating level 81.

In the preferred form of the invention the float sensor 85 will drop, causing control 86 to send a signal through line 89 to the main control mechanism 90. Control 90 will generate appropriate signals and transmit them through lines 91 to initiate a dilution cycle. The dilution cycle normally includes shutting off the steam or other heat source to heat exchanger 34 and stopping the cooling water flowing into conduit 23. In addition, pumps 48, 72 and 56 continue operation until the absorbent solution in the absorber reaches a concentration equal with that in the generator. At this point the absorbent solution will not crystallize when the machine cools down to ambient temperatures. When the absorbent solution in the generator is diluted, pumps 48, 72 and 56 will be shut down.

A typical dilution cycle is described and illustrated in U.S. Pat. No. 3,002,359. Some form of alarm can also be incorporated into the anticrystallization control to warn an operator that the machine is beginning to or has shut down due to impending crysallization, for example, a warning bell can be rung or an alarm light can be turned on.

Figure 2:
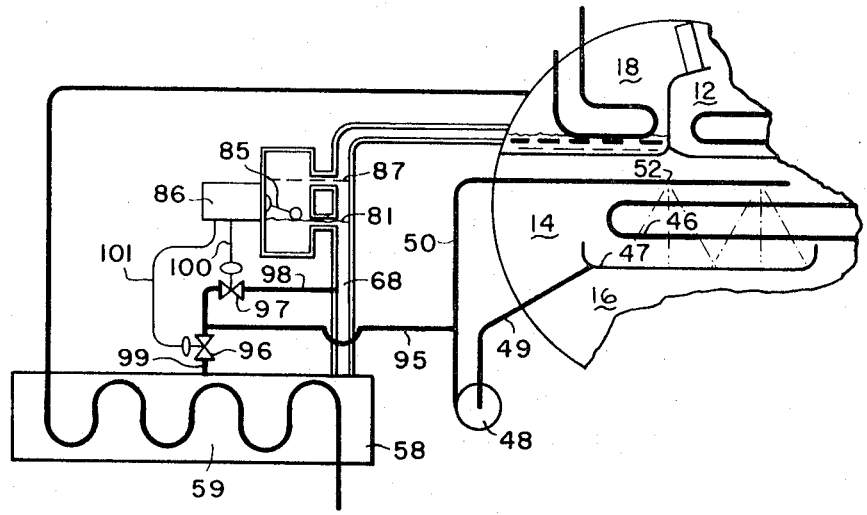
FIG. 2 is a schematic illustration of an absorption refrigeration machine employing the preferred embodiment of the anticrystallization control of the present invention. It illustrates a float control for dumping refrigerant into the heat exchanger.

The anticrystallization control illustrated in FIG. 2 is the preferred form of this invention. Wherever possible, for clarity and simplicity, numerals identical to those used in previous figures will be again utilized to indicate identical parts or operations of the machine. In this embodiment of my invention when the crystallization begins to occur, the concentrated solution level 81 in conduit 68 will begin to rise. When it reaches the level indicated at 87, float sensor 85 will activate control 86.

A conduit 95 is connected to and is in fluid communication with conduit 50. Refrigerant not evaporated in evaporator 14 drips from the heat exchanger 46 and is collected in evaporator pan 47. This liquid refrigerant travels through conduit 49 into pump 48 and is conveyed through conduit 50 to spray headers 52 where it is again sprayed over heat exchanger 46. Conduit 95 is in fluid communication with normally closed valves 96 and 97. Valve 97 is in fluid communication on its downstream side with conduit 68 by means of conduit 98. Valve 96 is in fluid communication with the concentrated solution flow passage 59 of heat exchanger 58 via conduit 99. The flow in conduit means 98 and 99 is controlled by valves 97 and 96, respectively. These conduits can be used separately or together to accomplish the purpose of this invention.

When control 86 is activated by float sensor 85, a signal is transmitted through either one or both of control lines 100 and 101. The optimum choice of which dumping point, either conduit 68 or heat exchanger flow passage 59 is dependent upon a number of factors, including the specific design of a given absorption machine. If conduit 68 is chosen as the dumping point, the signal from control 86 will travel through line 100 and will open normally closed valve 97. As valve 97 is opened, refrigerant from the evaporator pan 47 will be pumped by pump 48 into conduit 68. Thus, the concentrated solution in conduit 68, and eventually that in flow passage 59, will be diluted. The partially blocked heat exchange passages will be decrystallized and full flow therethrough will be resumed. If the heat exchange passage 59 is chosen as the point at which the refrigerant is dumped, a control signal will be transmitted through control line 101 to normally closed valve 96. Refrigerant will then be forced by pump 48 through conduit 95 and conduit 99 into concentrated solution passage 59. The concentrated solution in passage 59 will be diluted and decrystallized, thus initiating unimpeded flow therethrough.

As mentioned above, upon decrystallization the solution level in conduit 68 will again drop down to a normal operating level 81, allowing float sensor 85 to return to its original position. As it does so, control 86 will be activated to send control signals through either or both of control lines 100 and 101 to close valves 97 and/or 96 respectively. In addition, the dilution and shutdown cycle can be initiated by control 86 at this time. Its operation has been explained in conjunction with FIG. 1.

Figure 3:
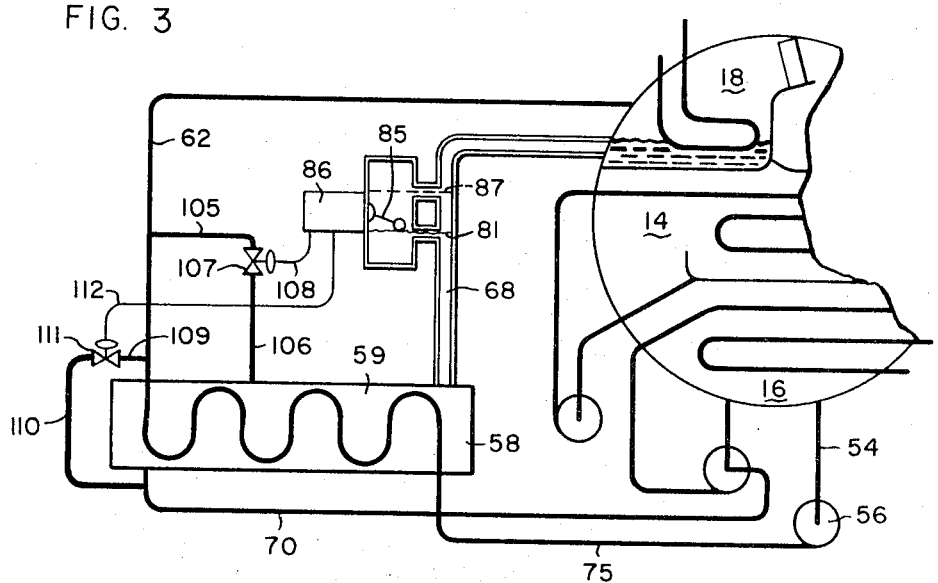
FIG. 3 is a schematic illustration of an absorption refrigeration machine employing another embodiment of the present invention. It illustrates a float control for dumping dilute absorbent solution into the heat exchanger.

Another embodiment of this invention is illustrated schematically in FIG. 3. The float sensor operates upon a rise of solution level in conduit 68 as explained above. In this form of the invention dilute solution from conduit 62 is dumped into the passages in conduits where crystallization occurs. Two dumping points are shown, both or either of which can be utilized to effect decrystallization, again depending upon the particular design of a given machine.

A conduit 105 is tapped into conduit 62. Normally closed valve 107 is connected to conduit 105 and to conduit 106, the latter of which is in fluid communication with heat exchange passage 59. As impending crystallization is sensed by float sensor 85, control 86 is actuated and transmits a signal through control line 108, opening normally closed valve 107. As valve 107 is opened, dilute solution from conduit 62 will be pumped into heat exchange passage 59, thus diluting the partially crystallized concentrated solution therein. As the concentrated solution is diluted it will decrystallize and normal flow through passage 59 can again resume.

Alternatively control 86 can transmit a signal through control line 112 to a normally closed valve 111. The upstream side of valve 111 is connected to conduit 62 by conduit 109. A downstream side of valve 111 is connected to the concentrated solution conduit 70 via conduit 110, thus allowing dilute solution to flow into conduit 70. As is evident, crystallization will not only occur in heat exchange passage 59, but can also occur in the concentrated solution conduit 70 which returns concentrated solution to the absorber from the heat exchanger 58. It is readily apparent that refrigerant can as well be dumped into conduit 70 and controlled as explained in conjunction with FIG. 2. Additionally, dilute solution from conduit 62 upon signal from control 86 can be dumped into concentrated solution conduit 68. However, for purposes of simplicity this latter alternative has not been illustrated. Switching the machine to a dilution and shutdown cycle can be effected when the concentrated solution drops to its normal operating level 81. This again would be accomplished as explained in conjunction with FIG. 1.

Figure 4:
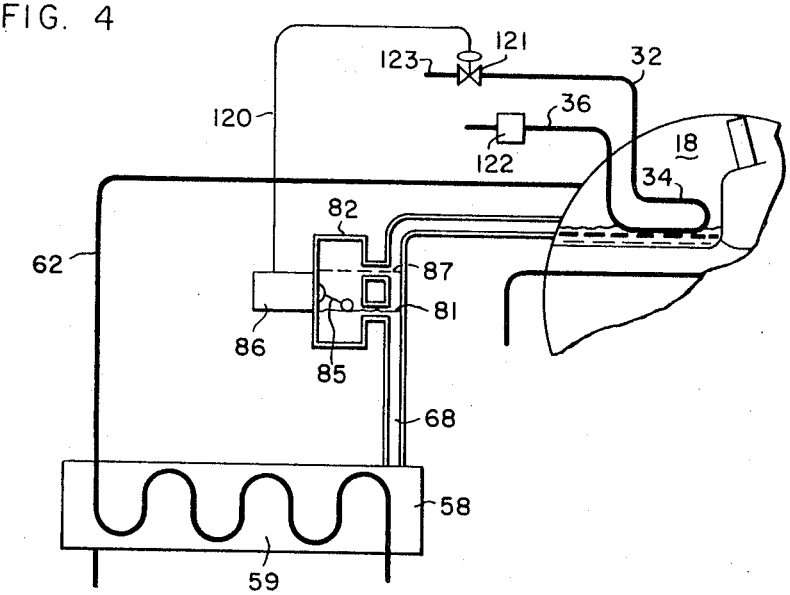
FIG. 4 is a schematic illustration of a portion of an absorption refrigeration machine employing still another embodiment of the present invention. It illustrates a float control for modifying heat input to the generator.
Figure 4:

In the embodiment illustrated in FIG. 4 the heat exchanger 34 of generator 18 is supplied with a heated fluid through conduit 32 from a heat source 123, for example, a water boiler. The flow of heated fluid, for example steam, is controlled by valve 121. A suitable restrictor 122 can be placed in outlet conduit 36 for use when steam is the heat source. Restrictor 122 will allow steam condensate to pass back to the heat source but will not allow steam to return. Again when crystallization begins to occur the level of concentrated solution in conduit 68 will rise to or above level 87, thus tripping float sensor 85. Control 86 will then transmit a signal through control line 120 to valve 121. Although valve 121 is a modulating valve which in the normal absorption refrigeration machine will be modulating the flow of heated fluid depending upon the refrigeration load placed upon the absorption machine.

The signal in line 120 will override any modulating signal and cause valve 121 to close, thus preventing additional heating fluid to enter heat exchanger 34. This in turn will cause concentration of absorption solution in generator 18 to cease. The absorption solution in generator 18 will be diluted by the dilute solution flowing from the absorber into the generator through conduit 88. This solution will then flow into conduit 68 and into heat exchange passage 59 of the heat exchanger 58. The diluted solution will effect decrystallization of heat exchange passage 59 and restore normal flow therethrough. Again as the solution level in conduit 68 drops back to a normal operating level 81 control 86 can be used to initiate the dilution and shutdown cycle as explained in conjunction with FIG. 1.

The control components utilized with the invention described above are of conventional manufacture. They can be, for example, electro-mechanically pneumatically actuated.

Although the decrystallization control of this invention has been explained in conjunction with a single stage generator absorption refrigeration machine, it can also be utilized with a two stage generator absorption machine. In the two stage machine crystallization will occur in the concentrated solution passages of the low temperature heat exchanger. The low temperature heat exchanger is one which is situated between the second stage, low pressure generator and the absorber. It exchanges heat between the concentrated solution flowing to the absorber and the dilute solution flowing from the absorber. The float chamber 82 of this invention would be located in the concentrated solution conduit connecting the second stage, low pressure generator and the low temperature heat exchanger.

An example of such a low temperature heat exchanger is illustrated in the drawing of U.S. Pat. 3,287,928, reference numeral 26. The fluid and control circuitry can easily be adapted by one of ordinary skill in the art from the preceding disclosure to an absorption refrigeration machine having a two stage generator and high and low temperature heat exchangers.

Therefore, what is claimed is:

1. An absorption refrigeration machine including an absorber, an evaporator, a condenser, a generator means for producing concentrated absorption solution, first conduit means for conducting concentrated solution from said generator means to said absorber, second conduit means for conducting dilute solution from said absorber to said generator means, and a heat exchange means for placing said second conduit means in heat exchange relationship with said first conduit means at a point between said generator and said absorber, said heat exchange means having a first flow passage comprising a portion of said first conduit means and a second flow passage comprising a portion of said second conduit means, said heat exchange means positioned below said generator means, the improvement comprising:
  a float chamber in parallel fluid communication with said first conduit means between said generator means and said heat exchange means, said float chamber positioned at least partially above a normal operating level of fluid in said first conduit means,
  control means responsive to a level of fluid in said float chamber to cause liquid refrigerant to be added directly to said concentrated solution whereby the concentration of said solution in said first flow passage is substantially reduced.

2. The machine of claim 1 including a first heat exchanger in said evaporator, a collection pan positioned below said heat exchanger, first circuit means including said pan for recirculating refrigerant from said collection pan for distribution onto said first heat exchanger, the improvement further comprising:
  third conduit means for placing said first circuit means and said first flow passage means in fluid communication,
  first valve means for controlling flow in said third conduit means, said first valve means being closed during a normal operational cycle of said machine, said control means actuating said first valve means.

3. The machine of claim 1 including a first heat exchanger in said evaporator, a collection pan positioned below said heat exchanger, first circuit means including said pan for recirculating refrigerant from said collection pan for distribution onto said first heat exchanger, the improvement further comprising:
  fourth conduit means for placing said first circuit means and said first conduit means between said generator means and said heat exchange means in fluid communication,
  second valve means for controlling flow in said fourth conduit means, said second valve means normally closed, said control means actuating said second valve means.

4. An absorption refrigeration machine including an absorber, an evaporator, a condenser, a generator producing concentrated absorption solution, first conduit means for conducting concentrated solution from said generator to said absorber, second conduit means for conducting dilute solution from said absorber to said generator, and a heat exchange means for placing said second conduit means in heat exchange relationship with said first conduit means at a point between said generator and said absorber, said heat exchange means having a first flow passage comprising a portion of said first conduit means and a second flow passage comprising a portion of said second conduit means, said heat exchange means positioned below said generator, the improvement comprising:
  sensing means for sensing a rise in level of concentrated solution in said first conduit means between said generator and said heat exchange means, said sensing means positioned at least partially above a normal operating level of concentrated solution in said first conduit means,
  control means for generating a signal responsive to said sensing means, and
  anticrystallization means for reducing the concentration of said concentrated solution in said first conduit means by addition of liquid refrigerant directly thereto, said anticrystallization means activated by said signal generated by said control means.

5. The machine of claim 4 including a first heat exchanger in said evaporator, a collection pan positioned below said heat exchanger, first circuit means including said pan for recirculating refrigerant from said collection pan for distribution onto said first heat exchanger, wherein said anticrystallization means comprises:
  third conduit means for placing said first circuit means and said first flow passage means in fluid communication,
  first valve means for controlling flow in said third conduit means, said first valve means being closed during a normal operational cycle of said machine, said control means actuating said first valve means.

6. The machine of claim 4 including a first heat exchanger in said evaporator, a collection pan positioned below said heat exchanger, first circuit means including said pan for recirculating refrigerant from said collection pan for distribution onto said first heat exchanger, wherein said anticrystallization means comprises:
  fourth conduit means for placing said first circuit means and said first conduit means between said generator means and said heat exchange means in fluid communication,
  second valve means for controlling flow in said fourth conduit means, said second valve means normally closed, said control means actuating said second valve means.

References Cited

UNITED STATES PATENTS

| | | | |
|---|---|---|---|
| 3,054,272 | 9/1962 | Leonard, Jr. | 62—141 X |
| 3,279,206 | 10/1966 | Leonard, Jr. | 62—141 |
| 3,287,928 | 11/1966 | Reid, Jr. | 62—141 |
| 3,452,552 | 7/1969 | Johnson | 62—141 |

WILLIAM F. O'DEA, Primary Examiner

P. D. FERGUSON, Assistant Examiner

U.S. Cl. X.R.

62—148, 476